United States Patent
Moharram

(10) Patent No.: US 8,656,866 B2
(45) Date of Patent: Feb. 25, 2014

(54) DISPOSABLE SANITARY GARMENTS FOR PETS

(76) Inventor: Omayma Elsayed Moharram, Carleton Place (CA)

( * ) Notice: Subject to any disclaimer, the term of this patent is extended or adjusted under 35 U.S.C. 154(b) by 1390 days.

(21) Appl. No.: 10/935,392

(22) Filed: Sep. 8, 2004

(65) Prior Publication Data

US 2005/0263105 A1 Dec. 1, 2005

(30) Foreign Application Priority Data

May 25, 2004 (CA) ...................................... 2467758

(51) Int. Cl.
*A01K 23/00* (2006.01)

(52) U.S. Cl.
USPC .......................................... 119/850; 119/868

(58) Field of Classification Search
USPC ............................. 119/171, 172, 850, 868, 869
See application file for complete search history.

(56) References Cited

U.S. PATENT DOCUMENTS

| | | | | |
|---|---|---|---|---|
| 3,211,132 A * | 10/1965 | Hersh | ....................... | 604/385.09 |
| 4,577,591 A | 3/1986 | Wesseldine | | |
| 4,813,949 A * | 3/1989 | O'Rourke | ...................... | 604/391 |
| 4,996,949 A * | 3/1991 | Wunderman et al. | ......... | 604/390 |
| 5,005,525 A * | 4/1991 | Stanton | ..................... | 604/385.14 |
| 5,062,392 A * | 11/1991 | Lavash | ........................... | 119/167 |
| 5,146,874 A * | 9/1992 | Vidal | ............................. | 119/868 |
| 5,234,421 A | 8/1993 | Lowman | | |
| 5,549,593 A * | 8/1996 | Ygge et al. | .................... | 604/391 |
| 5,555,847 A | 9/1996 | Kelly | | |
| 5,560,321 A * | 10/1996 | Hess | .............................. | 119/858 |
| 5,662,640 A * | 9/1997 | Daniels | ......................... | 604/392 |
| 5,934,226 A * | 8/1999 | Moore et al. | ................... | 119/868 |
| 5,954,015 A * | 9/1999 | Ohta | .............................. | 119/850 |
| 6,142,105 A * | 11/2000 | McKnight | ...................... | 119/850 |
| 6,368,313 B1 * | 4/2002 | Howard | ................... | 604/385.09 |
| 6,394,041 B1 * | 5/2002 | Katz | ............................. | 119/868 |
| 6,557,497 B1 * | 5/2003 | Milligan | ........................ | 119/850 |
| 6,675,745 B1 * | 1/2004 | Brewington | ................... | 119/869 |
| 6,710,221 B1 * | 3/2004 | Pierce et al. | ................... | 604/361 |
| 6,895,901 B1 * | 5/2005 | Howard | ......................... | 119/869 |
| 7,131,399 B2 * | 11/2006 | Blommel | ....................... | 119/712 |
| 2004/0074450 A1 * | 4/2004 | Soares et al. | .................. | 119/850 |
| 2004/0261725 A1 * | 12/2004 | Myers | ........................ | 119/51.01 |

* cited by examiner

*Primary Examiner* — David Parsley

(57) ABSTRACT

A disposable sanitary garment for pets, such as dogs, cats, and particularly those who lack control of their waste discharges by reason of advanced age, degenerative disease, and the like, is disclosed. The disposable sanitary garment comprises a disposable absorbent garment for engaging a portion of the back of a pet and extending over the tail area to a portion of the pet's underside for absorbing and containing the waste discharges from the pet. The garment further comprises hook and loop fastening means for securing the disposable absorbent garment on the pet at or about the abdomen area. The disposable absorbent garment comprises a tail aperture, a fluid-permeable top layer, a fluid-impermeable bottom layer, and an absorbent core interposed between the top layer and the bottom layer. The hook and loop fastening means comprise loop fastening tapes affixed to the disposable absorbent garment and an adjustable belt comprising a hook fastening tape for mating with the loop fastening tapes to circumferentially secure the disposable absorbent garment to the pet. The disposable sanitary garments vary in sizes and are packaged in a "for ever Chelsey" disposable garments packages.

20 Claims, 9 Drawing Sheets

View C-C

DISPOSABLE SANITARY GARMENTS FOR PETS

FIELD OF THE INVENTION

This invention relates generally to sanitary garments for animals and, in particular, to disposable sanitary garments for pets.

BACKGROUND OF THE INVENTION

Life with Pets is full of joys and sometime sorrow. Pets' unconditional love and companionship are source of joys to their owners. Pets who suffer from advanced age, degenerative disease, illness, incontinence, and the like, and who do not have complete control of their waste discharges, (such as liquid waste (e.g., urine and blood) and solid waste), are source of distress and inconvenient to their owners.

Lake of control of the waste discharges in pets also occurs in very young pets (e.g., puppies) during their training period; female animals (e.g., bitches) on heat; pets owned by persons residing in apartments who cannot immediately access out door areas; pets left unattended for extended period in the homes and the like; and pets in animal hospital before and after particular surgery or medical treatment.

Pets' waste discharges in the home, automobile, and the like, are source of annoyance and inconvenience to the owners. To overcome this problem, various spraying and cleaning products are proposed to mitigate pets' waste discharges. These products are not altogether satisfactory.

U.S. Pat. No. 6,142,105, entitled, "Securely fitting pet diaper", to McKnight, issued on Nov. 7, 2000, proposes a diaper garment for a household pet for absorbing and containing the waste discharges from the pet, the garment comprises a top potion adapted to engage a portion of the back of the pet and extending to about the tail area; and a bottom portion, attached to or integrally formed with the top portion, adapted to engage the rear end of the pet from about the tail area and extending to a portion of the pet's underside.

The garment further comprises side portions adapted to engage the flank areas of the pet and extending at least between respective flank edge areas of the top and bottom portions, the side portions comprised of elasticized material. The garment comprises a tail opening at or about the juncture of the top and bottom portions, the tail opening defined at least in part by circumferentially disposed elastic material. The garment comprises leg openings for the rear legs of the pet, the leg openings defined at least in part by circumferentially disposed elastic material. In addition, the garment comprises a liquid-absorbing material attached to or disposed in at least a portion of the pet facing surface of the bottom portion. It also comprises suspenders having at least a first end attached to a forward area of the top portion and at least a second end attached to a forward area of the bottom portion and adapted to engage the shoulder areas of the pet.

The McKnight's garment comprises multiple components: top portion; bottom portion, side portions, suspenders, and a belt that may result in a high cost manufacture of the garment for the pet. Further, because of the suspenders, the garment may lack comfort for the pet wearer and it may be difficult to put on the pet. The liquid-absorbing material attached to the bottom portion is relatively small and may not be sufficient to absorbing the liquid waste and containing the solid waste from the animal.

Other prior arts propose wide varieties of elaborate garments and articles for pets that are intended to address the waste discharges' problem. These elaborate garments and articles have shortcomings with respect to cost of manufacture; lack of comfort for the pet wearer; difficulty in putting the garment or the article on the pet; and inability to effectively absorb liquid waste and contain solid waste from the pet.

Pets' owners need a garment or an article that would be easy to put on the pet; would absorb the waste discharges from the pet; and would be easily disposed of in a sanitary way.

Consequently, there is a need in the industry to provide disposable sanitary garments for pets, (such as dogs, cats, and particularly those who do not have complete control of their waste discharges), that are convenient and effective for both the pet owner and the animal.

SUMMARY OF THE INVENTION

It is an object of the present invention to provide disposable sanitary garments for pets.

The invention, therefore, according to one aspect provides a disposable sanitary garment for a pet comprises a disposable absorbent garment for engaging a portion of the back of the pet and extending over the tail area to a portion of the pet's underside for absorbing liquid waste and containing solid waste from the pet. The disposable sanitary garment further comprises hook and loop fastening means for securing the disposable absorbent garment on the pet at or about the abdomen area.

In accordance to a first embodiment of this invention, the disposable absorbent garment comprises a tail aperture having elasticized edges; and three layers: a fluid-permeable top layer; a fluid-impermeable bottom layer; and an absorbent core interposed between the top layer and the bottom layer. The three layers' disposable absorbent garment effectively absorbs liquid waste and contains solid waste from the pet. The disposable absorbent garment has a rectangular shape or the like with the long sides' edges of the garment comprising elasticized edges.

The fluid-permeable top layer of the disposable absorbent garment comprises a woven, nonwoven, porous formed-film polyethylene, or polypropylene material. The absorbent core of the disposable absorbent garment comprises wood pulp fibres or wood pulp fibres in combination with absorbent gelling materials. The fluid-impermeable bottom layer of the disposable absorbent garment comprises flexible polyethylene sheets.

The hook and loop fastening means comprise loop fastening tapes affixed to the short sides' edges of the fluid-impermeable bottom layer of the disposable absorbent garment. The hook and loop fastening means further comprise a belt comprising a belt base and a hook fastening tape affixed to the belt base for mating with the loop fastening tapes to securely fit the disposable absorbent garment to the pet.

The hook fastening tape and loop fastening tapes are made of hook and loop fasteners material such as VELCRO® (a brand name of fabric hook-and-loop fasteners used for connecting objects) and the belt base is nonwoven laminates, film laminates, or elastomerics material. The belt is adjustable in length to circumferentially secure the disposable absorbent garment to the pet at or about the abdomen area. The belt is also washable and, hence, reusable.

Another aspect of the present invention provides a disposable sanitary garment for a pet having left and right front legs, left and right rear legs, a neck, a back, and a tail. The disposable sanitary garment comprises a disposable absorbent garment for engaging a portion of the back of the pet and extending over the tail area to a portion of the pet's underside for absorbing and containing the waste discharges from the pet.

The disposable sanitary garment further comprises hook and loop fastening means for securing the disposable absorbent garment on the pet at or about the abdomen area.

At or about the tail area, the disposable absorbent garment comprises a tail aperture. The tail aperture comprises elasticized edges for achieving a secure fit about the tail when the disposable sanitary garment is in place on the pet.

The disposable absorbent garment comprises three layers: a fluid-permeable top layer, a fluid-impermeable bottom layer, and an absorbent core interposed between the top layer and the bottom layer. The three layers' disposable absorbent garment effectively absorbs and contains the waste discharges from the pet. The garment has a rectangular shape or the like with its long sides' edges comprising elasticized edges for achieving a secure fit about the left and right rear legs when the disposable sanitary garment is in place on the pet.

The hook and loop fastening means comprise loop fastening tapes affixed to the short sides' edges of the fluid-impermeable bottom layer of the disposable absorbent garment and an adjustable belt comprising a hook fastening tape for mating with the loop fastening tapes to secure the disposable absorbent garment to the pet at or about the abdomen area.

In accordance to a second embodiment of this invention, the hook and loop fastening means further comprise long sides' hook and loop fastening tapes affixed to the top and bottom portions of the long sides' edges of the fluid-permeable top layer for achieving more secure fitting of the disposable absorbent garment about the left and right rear legs and flank areas of the pet when the disposable sanitary garment is in place on the pet.

The disposable sanitary garment varies in sizes to securely fit small-size, medium-size, large-size, and extra large-size household pets such as cats, dogs, and the like.

In accordance to a third embodiment of this invention, the disposable sanitary garments are packaged in packages, each package (namely, "for ever Chelsey" Disposable Garments) comprises at least one disposable absorbent garment; and at least one belt for securing the disposable absorbent garment to the pet at or about the abdomen area.

Conveniently, the "for ever Chelsey" disposable garments' package comprises a stack of disposable absorbent garments (for example, 5 to 30 disposable absorbent garments); and at least one belt, (for example, two or more belts). Each belt is adjustable, washable, and can be used (that is, reusable) with multiple disposable absorbent garments.

The disposable absorbent garment is easily putted on the pet and securely fitted to the pet; and when the disposable absorbent garment absorbed the liquid waste and/or contained the sold waste, disposed of it easily in a sanitary way. Accordingly, it eliminates the cleaning and maintenance associated with the elaborate garments, suspenders, harnesses, and supporter of the prior arts.

The embodiments of the present invention provide disposable sanitary garments for pets, (such as dogs, cats, and particularly those who lack control of their waste discharges by reason of advanced age or medical condition), that would overcome the shortcomings and limitations of the prior arts.

BRIEF DESCRIPTION OF THE DRAWINGS

The invention will be better understood from the following description of a preferred embodiment together with reference to the accompanying drawing, in which.

Similar references are used in different figures to denote similar components.

DETAILED DESCRIPTION OF THE PREFERRED EMBODIMENT

Figure 1:
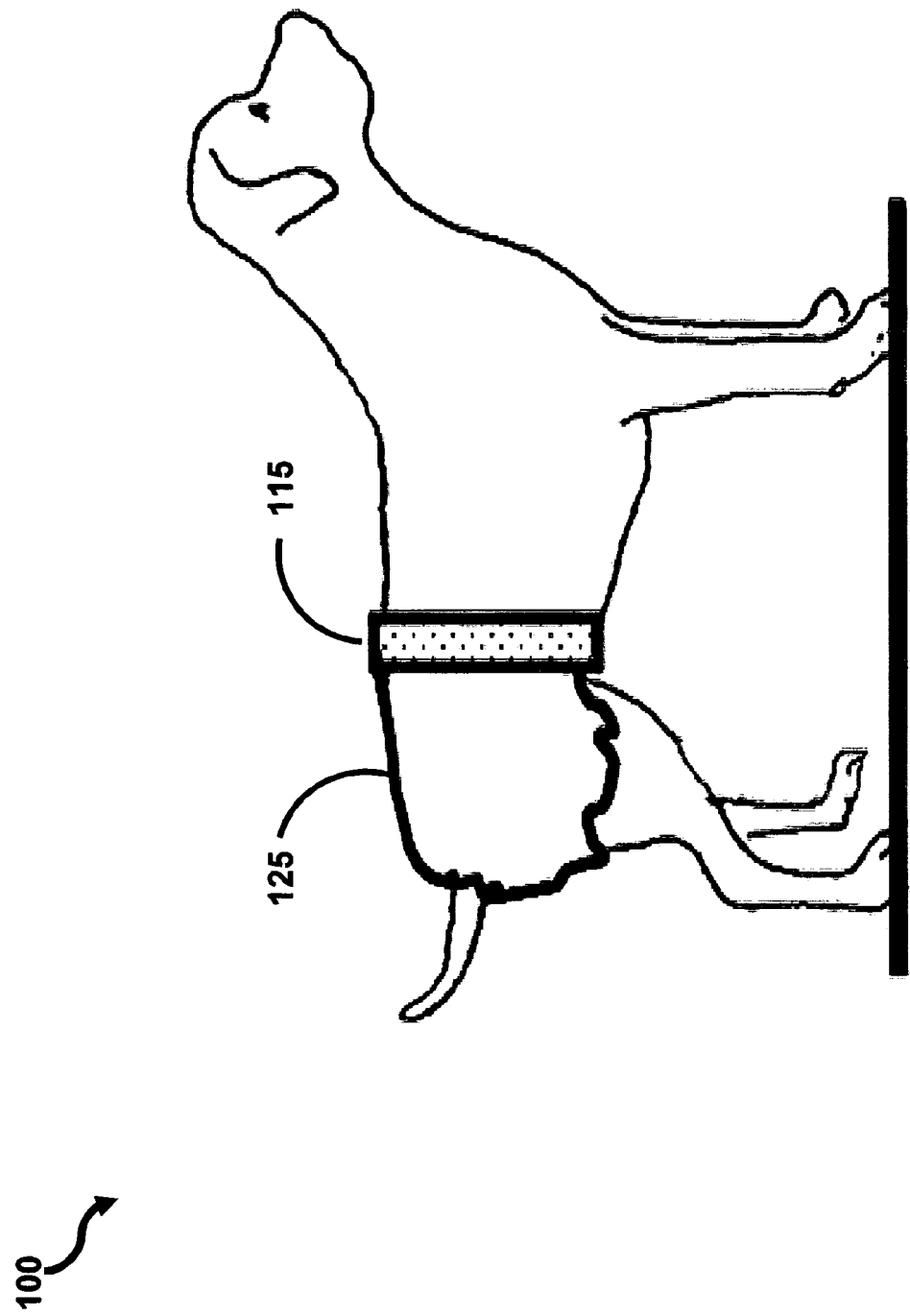
FIG. 1 is a diagram illustrating a disposable sanitary garment securely fitted to a pet (such as a dog) in accordance with the present invention.

FIG. 1 shows a diagram 100 illustrating a disposable sanitary garment for a pet (such as a dog), and more particularly, illustrating a secure fitting disposable sanitary garment for such pet, so as to absorb and contain the waste discharges from the pet. The disposable sanitary garment 100 comprises a disposable absorbent garment 125 for engaging a portion of the back of the pet and extending over the tail area to a portion of the pet's underside. The disposable sanitary garment 100 further comprises a belt 115 for securing the disposable absorbent garment 125 on the pet at or about the abdomen area.

Figure 2:
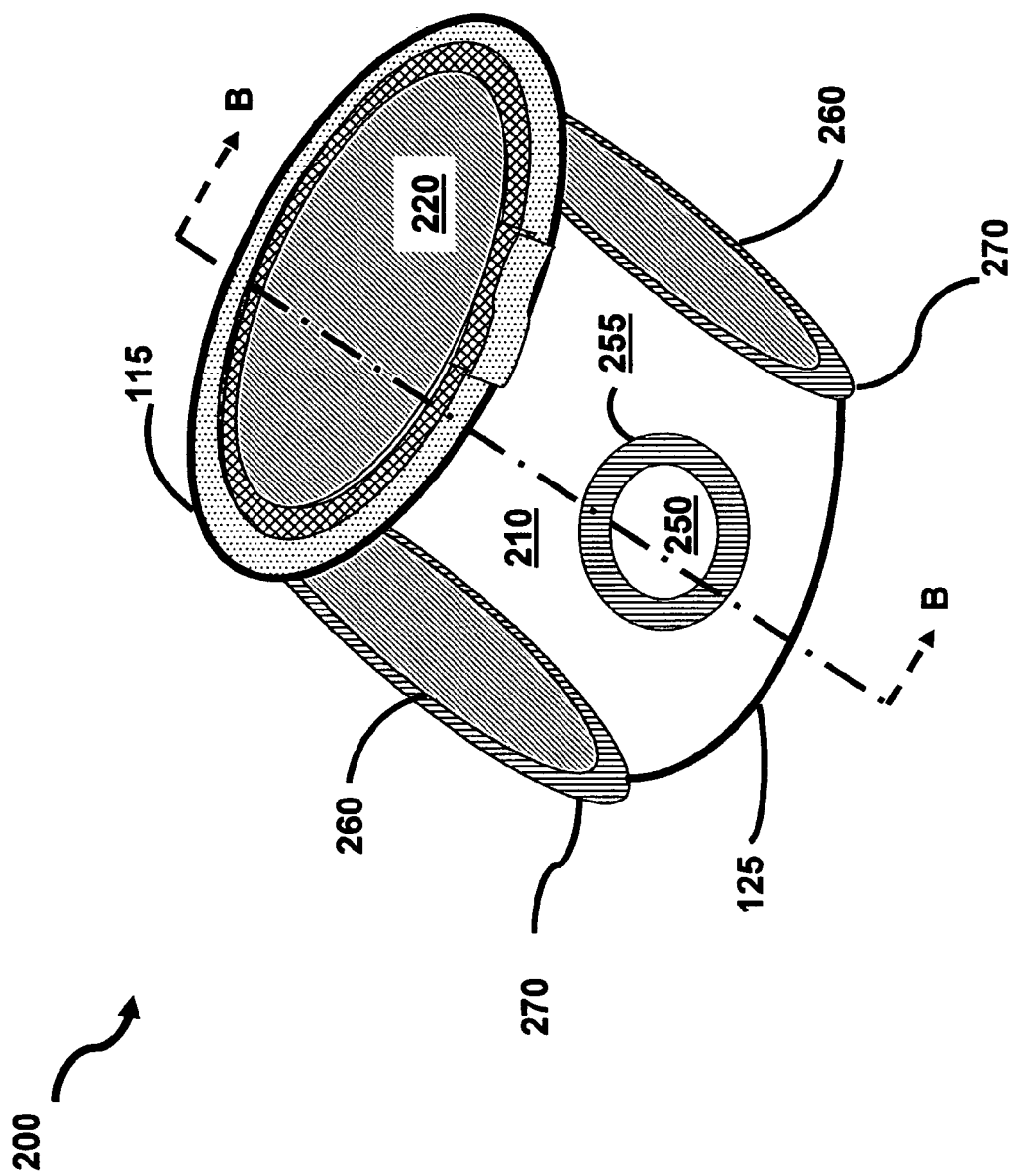
FIG. 2 is a diagram illustrating the disposable sanitary garment of FIG. 1, in accordance with a first embodiment of the present invention.

FIG. 2 shows a diagram 200 illustrating the disposable sanitary garment 100 of FIG. 1, comprising the disposable absorbent garment 125 having a tail aperture 250; and the belt 115.

The disposable absorbent garment 125 has a rectangular shape or the like, wherein the long sides' edges (shown collectively as) 270 comprise elasticized edges (shown collectively as) 260 for achieving a secure fit about the left and right rear legs of the pet when the disposable sanitary garment 200 is in place on the pet (as shown in FIG. 1). The short sides' edges (not shown) of the disposable absorbent garment 125 comprise loop fastening tapes (not shown).

The tail aperture 250 comprises elasticized edges 255 for achieving a secure fit about the tail when the disposable sanitary garment 200 is in place on the pet.

The disposable absorbent garment 125 comprises three layers: a fluid-permeable top layer 220, a fluid-impermeable bottom layer 210, and an absorbent core (not shown) interposed between the top layer 220 and the bottom layer 210. The disposable absorbent garment 125 varies in sizes to securely fit a small-size, a medium-size, a large-size, or an extra large-size pet. For example, for the small-size pet, the disposable absorbent garment 125 may be 70 centimeters in length and 25 centimeters in width; for the medium-size pet, the disposable absorbent garment 125 may be 80 centimeters in length and 40 centimeters in width; for the large-size pet, the disposable absorbent garment 125 may be 90 centimeters in length and 55 centimeters in width; et cetera.

Figure 3:
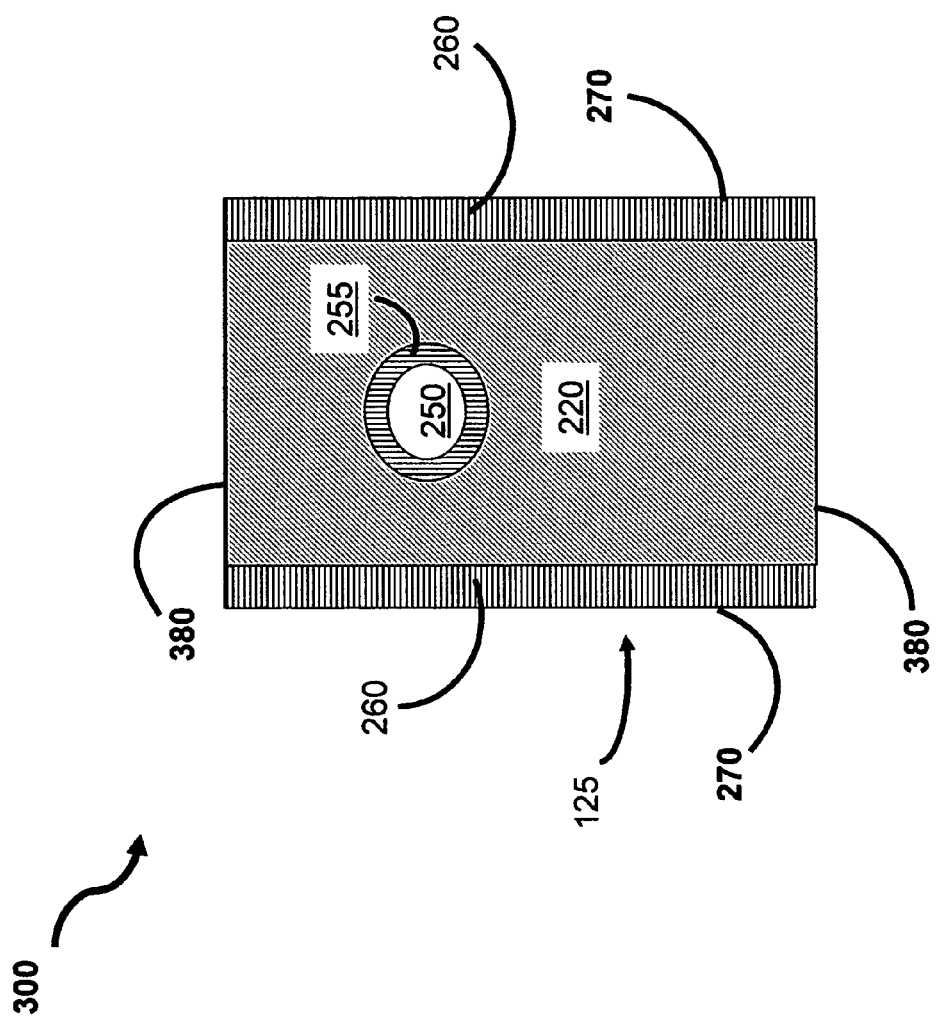
FIG. 3 is a diagram illustrating a top layer of the disposable absorbent garment for the disposable sanitary garment of FIG. 2, in accordance with the embodiment of the present invention.

FIG. 3 shows a diagram 300 illustrating a top layer 220 of the disposable absorbent garment 125, comprising the tail aperture 250 having the elasticized edges 255; the long sides' edges (shown collectively as) 270 comprising the elasticized edges (shown collectively as) 260; and short sides' edges (shown collectively as) 380. The fluid-permeable top layer 220 of the disposable absorbent garment 125 comprises a woven, nonwoven, porous formed-film polyethylene, polypropylene material, or the like.

Figure 4:
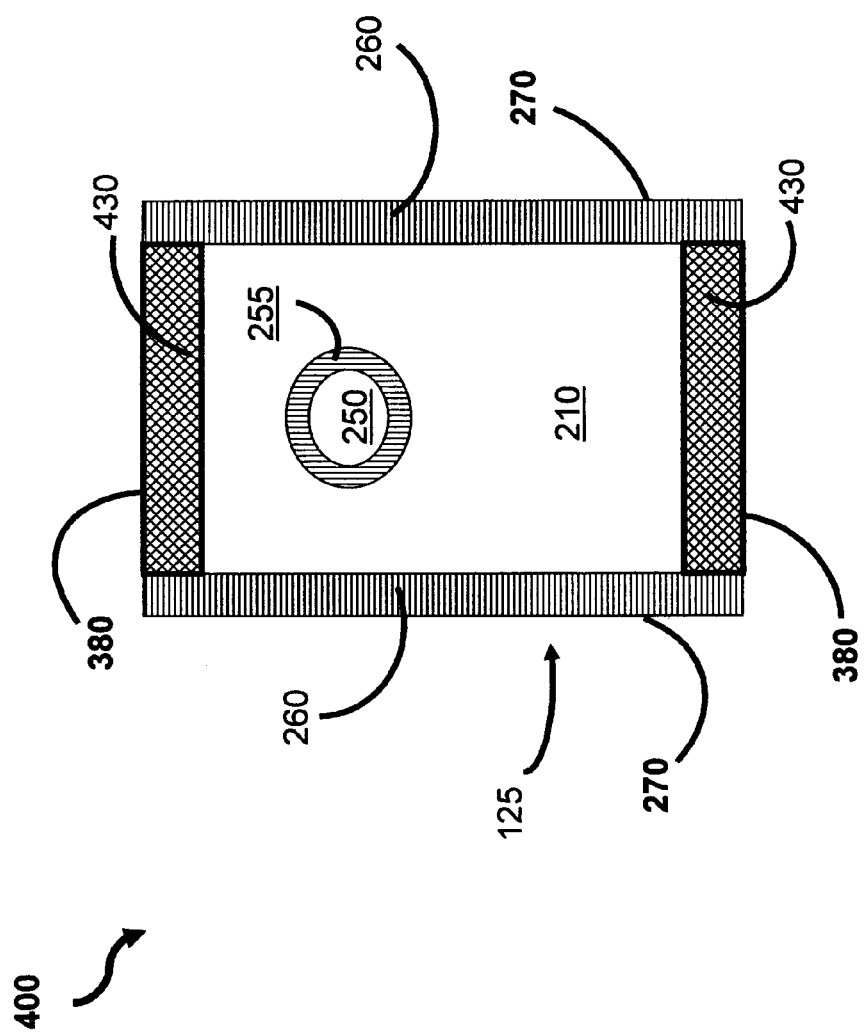
FIG. 4 is a diagram illustrating a bottom layer of the disposable absorbent garment for the disposable sanitary garment of FIG. 2, in accordance with the embodiment of the present invention.

FIG. 4 shows a diagram 400 illustrating a bottom layer 210 of the disposable absorbent garment 125, comprising the tail aperture 250 having the elasticized edges 255; the long sides' edges (shown collectively as) 270 comprising the elasticized edges (shown collectively as) 260; and loop fastening tapes (shown collectively as) 430 affixed to the short sides' edges (shown collectively as) 380. The loop fastening tapes (shown collectively as) 430 are made of hook and loop fasteners material such as VELCRO® hook-and-loop fasteners or the like. The fluid-impermeable bottom layer 210 of the disposable absorbent garment 125 comprises flexible polyethylene sheets or the like.

Figure 5:
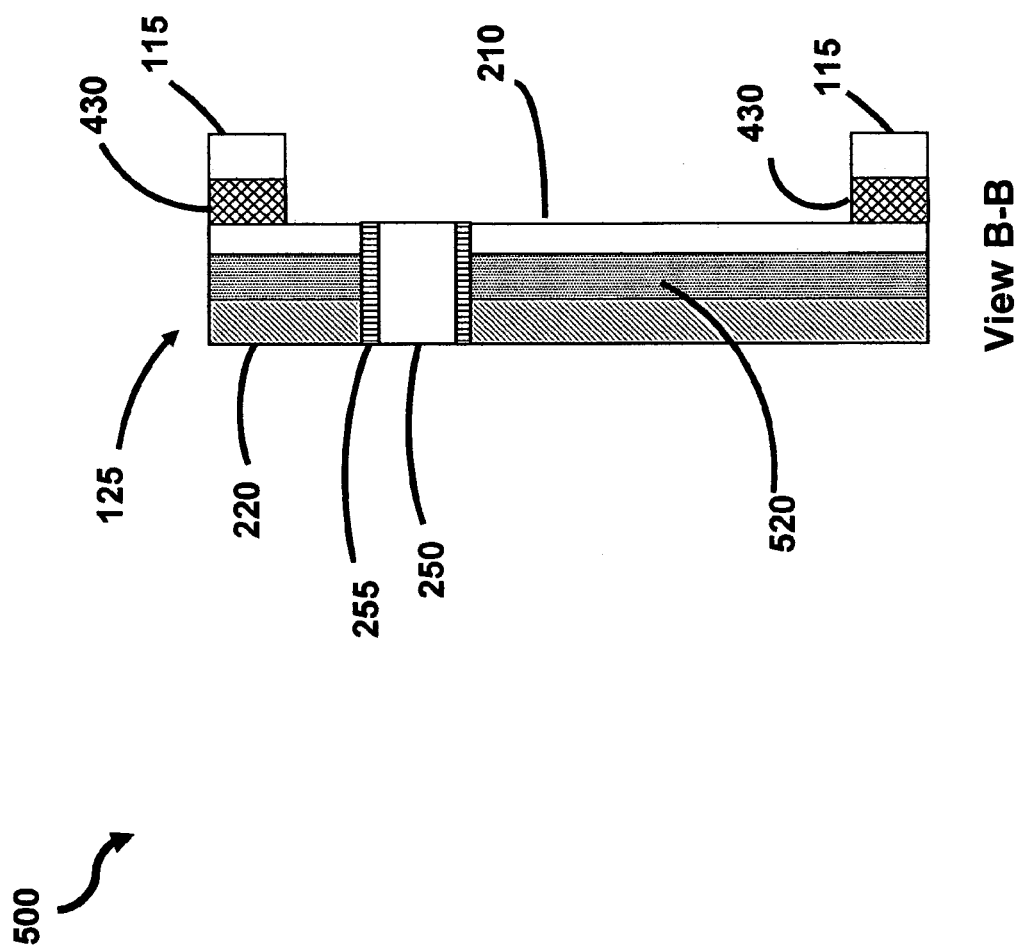
FIG. 5 is an enlarged section taken through the disposable sanitary garment of FIG. 2, in accordance with the embodiment of the present invention.

FIG. 5 shows a diagram 500 illustrating an enlarged section taken through the disposable sanitary garment 200 of FIG. 2, comprising the tail aperture 250 having the elasticized edges 255; the top layer 220; the bottom layer 210; the loop fastening tapes (shown collectively as) 430; the belt 115; and an absorbent core 520. The absorbent core 520 of the disposable absorbent garment 125 comprises wood pulp fibres or wood pulp fibres in combination with absorbent gelling materials or the like. The three layers' disposable absorbent garment 125 effectively absorbs and contains the waste discharges from the pet.

Figure 6:
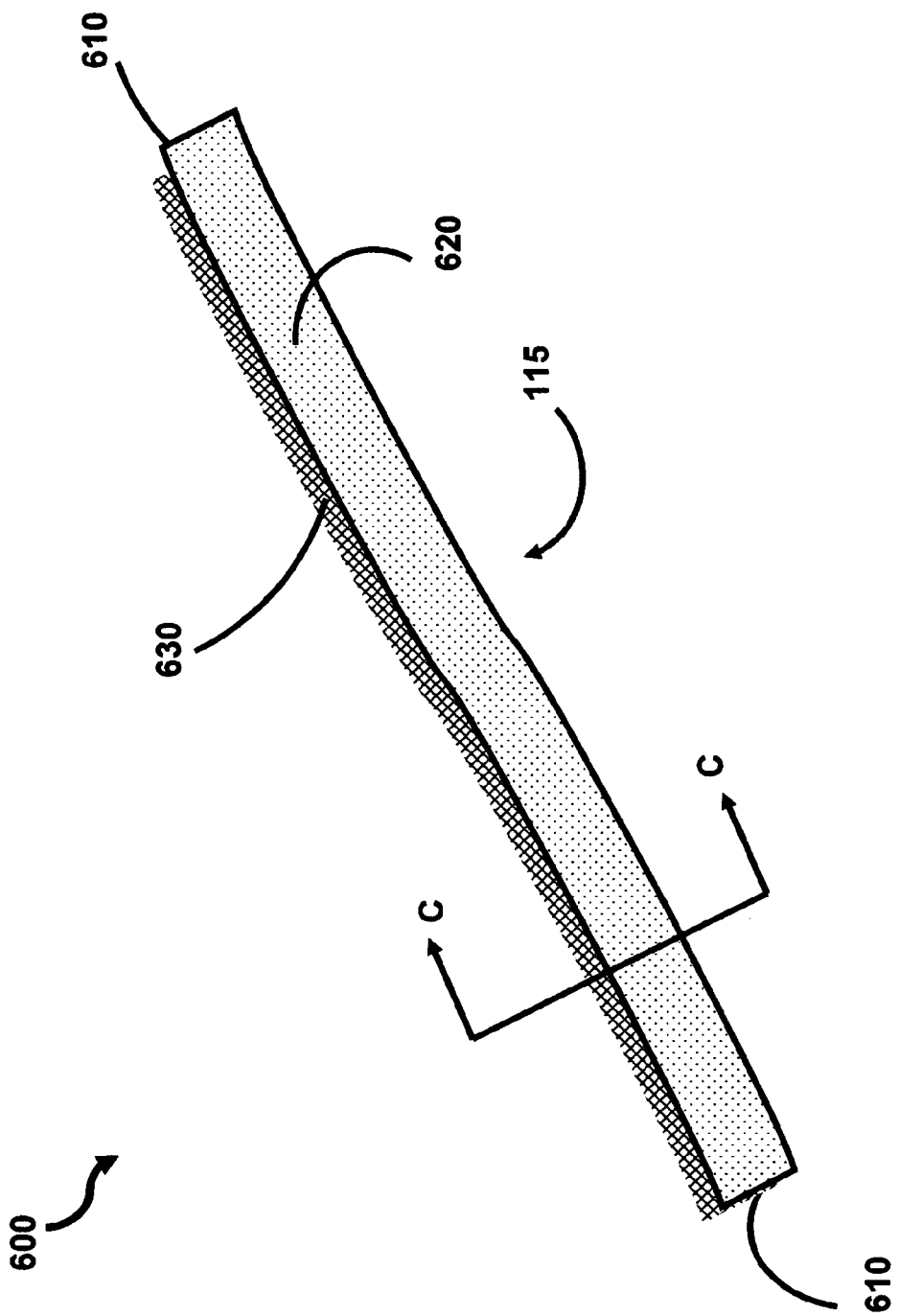
FIG. 6 is a diagram illustrating a belt for the disposable sanitary garment of FIG. 2, in accordance with the embodiment of the present invention.

FIG. 6 shows a diagram 600 illustrating the belt 115 for the disposable sanitary garment 200 of FIG. 2, comprising a belt base 620; a hook fastening tape 630; and belt ends (shown collectively as) 610. The hook fastening tape 630 is affixed to the belt base 620 for mating with the loop fastening tapes (shown collectively as) 430 in FIG. 4, to secure the disposable absorbent garment 125 to the pet. The hook fastening tape 630 is made of hook and loop fasteners material such as VEL-CRO®-hook-and-loop fasteners or the like.

The belt base 620 is made of nonwoven laminates, film laminates, or elastomerics material, or the like. The belt 115 is adjustable in length to circumferentially secure the disposable absorbent garment 125 to the pet at or about the abdomen area. The belt ends (shown collectively as) 610 facilitate the adjustment of the belt 115. The belt 115 is made of washable material and hence, can be used with multiple disposable absorbent garments.

Figure 7:
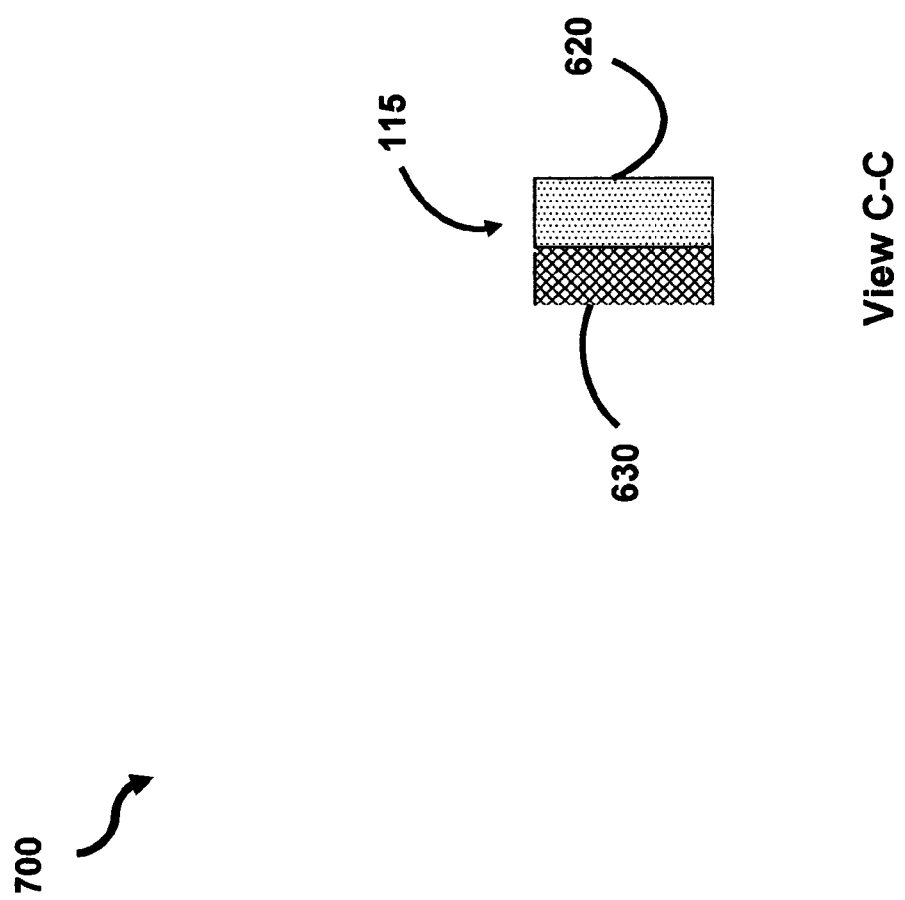
FIG. 7 is an enlarged section taken through the belt of FIG. 6, in accordance with the embodiment of the present invention.

FIG. 7 shows a diagram 700 illustrating an enlarged section taken through the belt 115 of FIG. 6, comprising the belt base 620 and the hook fastening tape 630 affixed to the belt base 620.

Figure 8:
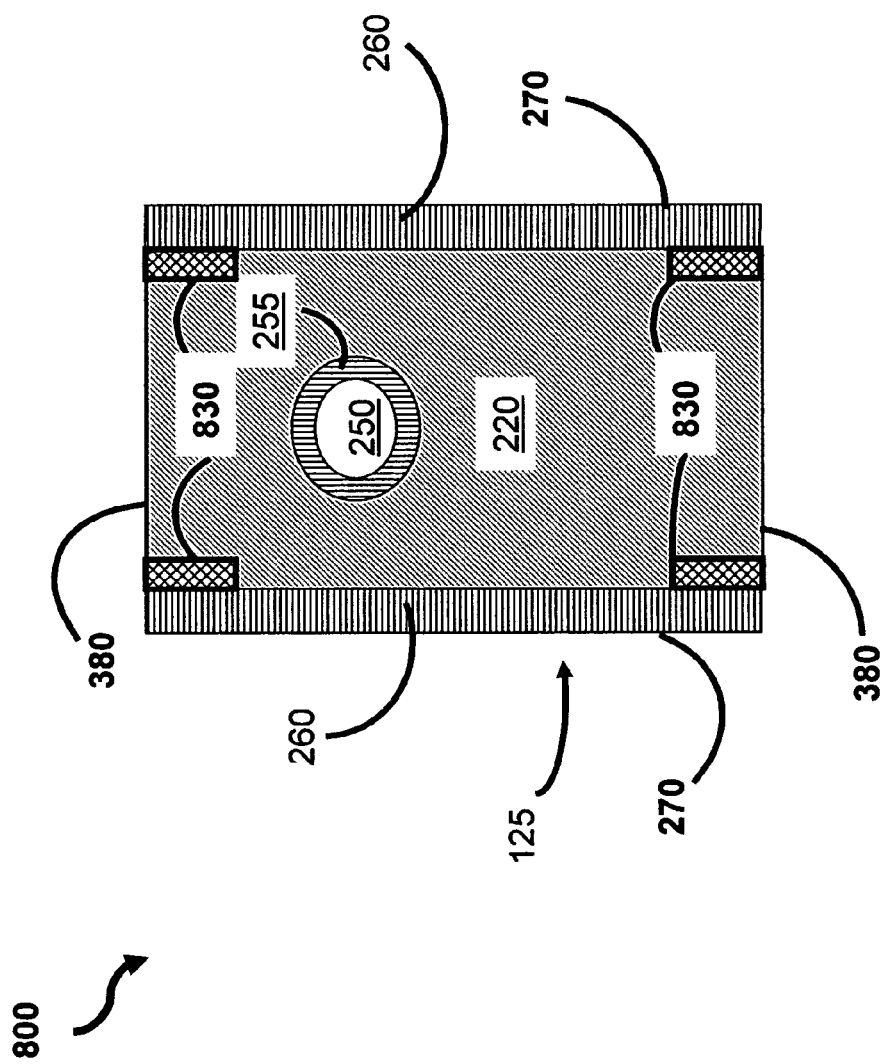
FIG. 8 is a diagram illustrating a top layer of the disposable absorbent garment for the disposable sanitary garment of FIG. 2, in accordance with a second embodiment of the present invention.

FIG. 8 shows a diagram 800 illustrating a top layer 220 of the disposable absorbent garment 125, comprising the tail aperture 250 having the elasticized edges 255; the long sides' edges (shown collectively as) 270 comprising the elasticized edges (shown collectively as) 260; and the short sides' edges (shown collectively as) 380. For more secure fitting of the disposable sanitary garment 200 of FIG. 2 to the pet, the top layer 220 of the disposable absorbent garment 125 further comprises long sides' hook and loop fastening tapes (shown collectively as) 830 affixed to the top and bottom portions of the long sides' edges (shown collectively as) 270. The long sides' hook and loop fastening tapes (shown collectively as) 830 are adjacent to the elasticized edges (shown collectively as) 260 of the disposable absorbent garment 125.

In this embodiment, the long sides' hook and loop fastening tapes (shown collectively as) 830 would achieve more secure fitting of the disposable absorbent garment 125 about the left and right rear legs and flank areas of the pet when the disposable sanitary garment is in place on the pet (as shown in FIG. 1). As before, the fluid-permeable top layer 220 of the disposable absorbent garment 125 comprises a woven, nonwoven, porous formed-film polyethylene, polypropylene material, or the like.

Figure 9:
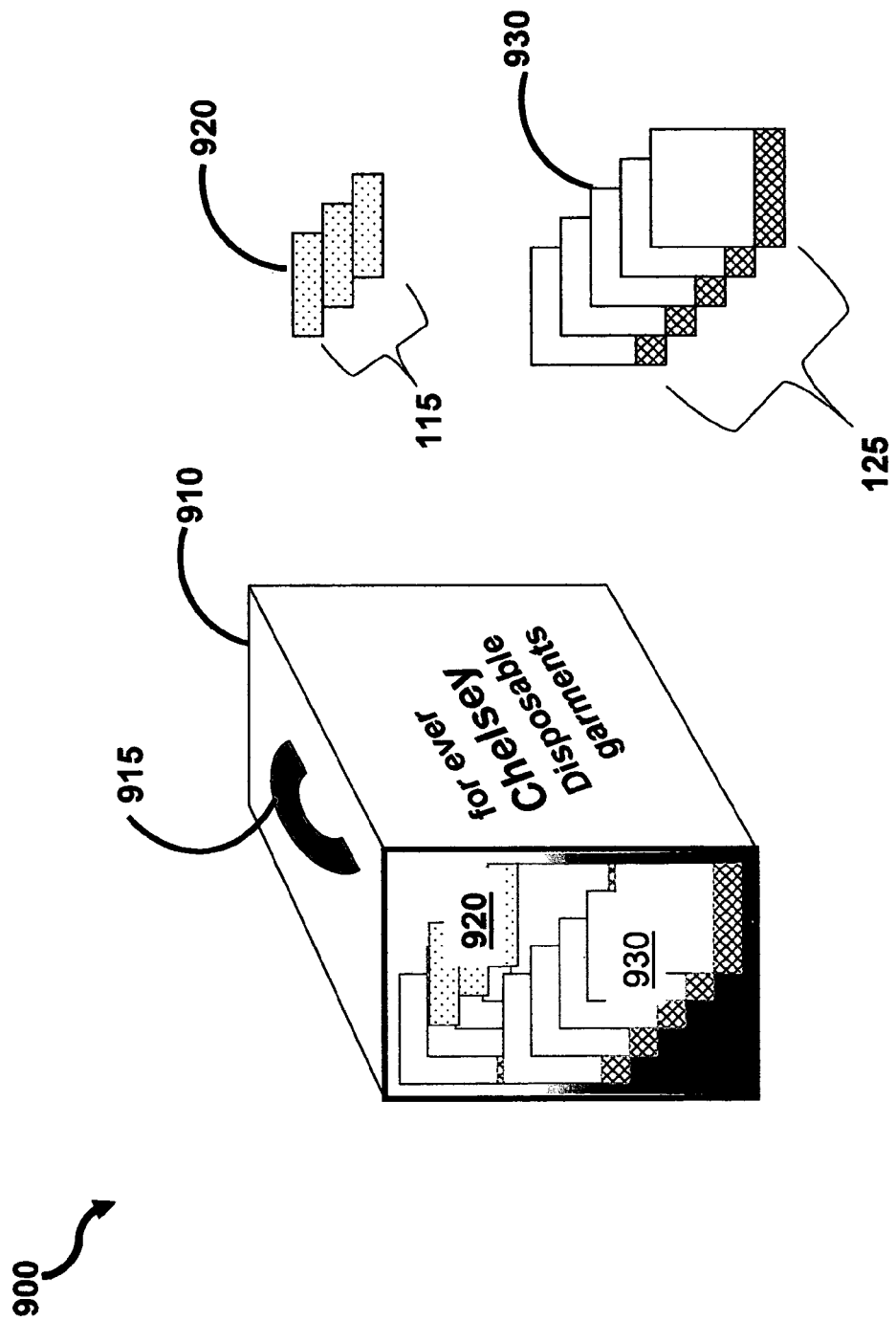
FIG. 9 is a diagram illustrating a "for ever Chelsey" disposable garments package for the disposable sanitary garment of FIG. 2, in accordance with a third embodiment of the present invention.

FIG. 9 shows a diagram 900 illustrating a "for ever Chelsey" disposable garments package comprises a bag 910 having a handle 915. FIG. 9 also shows a stack of wrapped up disposable absorbent garments 930 and a stack of wrapped up belts 920. The bag 910 may include multiple stacks of wrapped up disposable absorbent garments 930 and at least one stack of wrapped up belts 920, and each belt 115 may be used with multiple disposable absorbent garments. When the disposable absorbent garment 125 absorbed the liquid waste and/or contained the sold waste, pet's owner disposed of it easily in a sanitary way and securely fit another disposable absorbent garment 125 to the pet. The bag 910 and the handle 915 are made of plastic material, paper material, and the like.

Conveniently, the embodiments of this invention provide disposable sanitary garments for a pet, wherein the three layers' disposable absorbent garment effectively absorbs and contains the waste discharges from the pet. Each disposable sanitary garment is securely fitted to the pet and easily disposed of it in a sanitary way. The garments may be packaged in 5 to 30 disposable absorbent garments and 2 to 3 adjustable, washable, and reusable belts in a package.

It will be apparent to those with skill in the art that modifications to the above embodiments can occur without deviating from the scope of the present invention. Accordingly, the disclosures and descriptions herein are intended to be illustrative, but not limiting, of the scope of the invention which is set forth in the following claims.

What is claim is:

1. A disposable sanitary garment for pets which consists of:
   (a) a disposable absorbent garment for engaging a portion of the back of a pet and extending over the tail area to a portion of the pet's underside, said disposable absorbent garment consisting of:
      (w) rectangular shaped layers of material which consist of a fluid-permeable top layer, a fluid-impermeable bottom layer, and an absorbent core interposed between said top layer and said bottom layer, said layers of material being of equal length and said layers of material being of equal width, and bonded together forming a rectangular periphery of said layers of material,
      (x) elasticized edges along long sides' edges of the garment for achieving a secure fit about the pet's rear legs,
      (y) loop fastening tapes affixed along an entire width of short sides' edges of the garment, and
      (z) a tail aperture at or about the tail area, the tail aperture having elasticized edges for achieving a secure fit about the pet's tail when said garment is in place on the pet; and
   (b) a belt encircling the rectangular layers of material forming said disposable absorbent garment in (a) to securely fit said garment on the pet at or about the abdomen area, the belt having a belt base and a hook fastening tape affixed along the entire belt base for mating with the loop fastening tapes affixed along the entire width of the short sides' edges of said garment, said belt being removable from said garment by detaching the hook fastening tape affixed to the entire belt base from the loop fastening tapes affixed along the entire width of the short sides' edges of the garment.

2. The disposable sanitary garment as described in claim 1, wherein the top layer, the absorbent core, and the bottom layer are bonded together by a sealing material.

3. The disposable sanitary garment as described in claim 1, wherein the loop fastening tapes are affixed to the entire width of the short sides' edges of the fluid-impermeable bottom layer of said disposable absorbent garment.

4. The disposable sanitary garment as described in claim 1, wherein the belt is washable and reusable.

5. The disposable sanitary garment as described in claim 4, wherein the hook fastening tape and the loop fastening tapes are made of hook and loop fasteners material.

6. The disposable sanitary garment as described in claim 4, wherein the belt base is nonwoven laminates, film laminates, or elastomerics material.

7. The disposable sanitary garment as described in claim 6, wherein the belt is adjustable in length to circumferentially securely fit said disposable absorbent garment to the pet at or about the abdomen area.

8. The disposable sanitary garment as described in claim 1, wherein the garment is securely placed on the pet for absorbing and containing waste discharges from the pet and preventing leakages of the waste discharges from the pet.

9. The disposable sanitary garment as described in claim 1, wherein the fluid-permeable top layer of said disposable absorbent garment is made of a woven, nonwoven, porous formed-film polyethylene, or polypropylene material.

10. The disposable sanitary garment as described in claim 1, wherein the absorbent core of said disposable absorbent garment is made of wood pulp fibers or wood pulp fibers in combination with absorbent gelling materials.

11. The disposable sanitary garment as described in claim 1, wherein the fluid-impermeable bottom layer of said disposable absorbent garment is made of flexible polyethylene sheets.

12. A disposable sanitary garment for a pet having left and right front legs, left and right rear legs, a neck, a back, and a tail, said disposable sanitary garment consists of:
  (c) a disposable absorbent garment for engaging a portion of the back of the pet and extending over the tail area to a portion of the pet's underside for absorbing and containing waste discharges from the pet, said disposable absorbent garment consisting of:
    (j) rectangular shaped layers of material which consist of a fluid-permeable top layer, a fluid-impermeable bottom layer, and an absorbent core interposed between said top layer and said bottom layer, said layers of material being of equal length and said layers of material being of equal width, and bonded together forming a rectangular periphery of said layers of material,
    (k) elasticized edges along long sides' edges of the garment for achieving a secure fit about the left and right rear legs of the pet, for preventing leakages of the waste discharges from the pet when said garment is in place on the pet,
    (l) hook fastening tapes affixed to top portions along the long sides' edges of the fluid-permeable top layer for mating with loop fastening tapes affixed to bottom portions along the long sides' edges of the fluid-permeable top layer for achieving more secure fitting of said disposable absorbent garment about the left and right rear legs and flank areas of the pet when said garment is in place on the pet,
    (m) loop fastening tapes affixed along an entire width of short sides' edges of said garment, and
    (n) a tail aperture at or about the tail area, the tail aperture having elasticized edges for achieving a secure fit about the tail when said garment is in place on the pet; and
  (d) a belt encircling the rectangular layers of material forming said disposable absorbent garment in (c) to securely fit said garment on the pet at or about the abdomen area, the belt having a belt base and a hook fastening tape affixed along the entire belt base for mating with the loop fastening tapes affixed along the entire width of the short sides' edges of said garment, said belt being removable from said garment by detaching the hook fastening tape affixed to the entire belt base from the loop fastening tapes affixed along the entire width of the short sides' edges of the garment.

13. The disposable sanitary garment as described in claim 12, wherein the belt is washable and reusable.

14. The disposable sanitary garment as described in claim 12, wherein said garment is securely placed on a household pet including a cat and a dog.

15. The disposable sanitary garment as described in claim 12, wherein the loop fastening tapes are affixed to the entire width of the short sides' edges of the fluid-impermeable bottom layer of said disposable absorbent garment.

16. The disposable sanitary garment as described in claim 13, wherein the belt is adjustable in length to circumferentially securely fit said disposable absorbent garment to the pet at or about the abdomen area.

17. The disposable sanitary garment as described in claim 14, wherein said garment is securely placed on a small-size pet, a medium-size pet, a large-size pet, or an extra large-size pet.

18. A package of disposable sanitary garments for pets consists of:
  (i) at least one disposable absorbent garment for absorbing and containing waste discharges from a pet, said disposable absorbent garment consisting of:
    (q) rectangular shaped layers of material which consist of a fluid-permeable top layer, a fluid-impermeable bottom layer, and an absorbent core interposed between said top layer and said bottom layer, said layers of material being of equal length and said layers of material being of equal width, and bonded together forming a rectangular periphery of said layers of material,
    (r) elasticized edges along long sides' edges of the garment for achieving a secure fit about the pet's rear legs,
    (s) loop fastening tapes affixed along an entire width of short sides' edges of the garment, and
    (t) a tail aperture at or about the tail area, the tail aperture having elasticized edges for achieving a secure fit about the pet's tail when said garment is in place on the pet; and
  (ii) at least one belt encircling the rectangular layers of material forming said disposable absorbent garment in (i) to securely fit said garment on the pet at or about the abdomen area, the belt having a belt base and a hook fastening tape affixed along the entire belt base for mating with the loop fastening tapes affixed along the entire width of the short sides' edges of said garment, said belt being removable from said garment by detaching the hook fastening tape affixed to the entire belt base from the loop fastening tapes affixed along the entire width of the short sides' edges of the garment.

19. The package as described in claim 18, wherein the belt is adjustable in length to circumferentially securely fit said disposable absorbent garment to the pet at or about the abdomen area.

20. The package as described in claim 18, wherein the belt is washable and reusable.

* * * * *